United States Patent Office 3,415,862
Patented Dec. 10, 1968

3,415,862
PROCESS FOR RECOVERING HIGHER ALUMINUM ALKYLS FROM COMPLEXES CONTAINING SAME
William C. Ziegenhain, Ponca City, Okla., assignor to Continental Oil Company, Ponca City, Okla., a corporation of Delaware
No Drawing. Filed July 24, 1964, Ser. No. 385,049
8 Claims. (Cl. 260—448)

ABSTRACT OF THE DISCLOSURE

A stable complex of an aluminum alkyl wherein the alkyl moiety is composed essentially of two different alkyl groups is reacted with an aluminum trialkyl having alkyl groups corresponding to the lower alkyl group of said complex to effect selective displacement of the higher alkyl group present therein in the form of an uncomplexed aluminum alkyl.

---

This invention relates to complexes of organo-aluminum compounds and specifically to complexes of aluminum alkyls. More particularly, it concerns a method for selectively recovering the propyl and higher alkyl groups contained by such complexes as free aluminum alkyls preparatory to regenerating or converting the complexes to a form suitable for use in further complexing applications.

A recent important discovery in the field of organoaluminum chemistry was the finding that aluminum alkyls will combine with a limited number of organic and inorganic compounds to yield relatively heat-stable complexes. The substances suitable for complexing with the aluminum compounds in this manner are singularly characterized in being strong electron donors. The ability of a compound to yield an electron readily, however, does not in itself assure that the compound will coordinate with an aluminum alkyl to provide a satisfactory stable complex. Suitable complexing agents must also meet certain molecular configuration requirements. Some notable examples of electron donors which form stable complexes with the aluminum alkyls include: all of the alkali metal fluorides, rubidium chloride and cesium chloride or bromide; the alkali metal salts of certain pseudo halides, e.g., the alkali metal cyanides and azides; the tetraalkyl ammonium halides as well as similarly quaternized compounds based on the elements phosphorous, arsenic, sulphur, selenium or tellurium; a plurality of ethers and thioethers of which at least one of the ether substituents is an aryl group; and tertiary amines having at least one aryl substituent.

The complexes of aluminum alkyl and the coordinating compound are schematically depicted by the following general formula in which the letter A represents a mole of a suitable complexing agent corresponding to any of the applicable compounds mentioned above:

$$A \cdot (AlR_3)_{1-2.1}$$

As indicated by the formula given, the molar amount of aluminum trialkyl present in the members of this broad class of complexes varies depending upon the nature of the complexing agent. Lately, special interest has centered upon those complexing agents capable of uniting with an aluminum alkyl to form two types of stable complexes which, from a composition standpoint, only differ from one another in regard to aluminum alkyl content. Of the complexing agents enumerated hereinabove, those adapted to form the two types of complexes include the alkali metal fluorides, the alkali metal cyanides, the alkali metal azides and the tetraalkyl ammonium halides. The fluoride salts, as well as the quaternized ammonium compounds yield, in one form, a complex containing two moles of the aluminum trialkyl per mole of the complexing agent. These specific complexing agents will also yield a stable 1:1 complex, that is, a complex composed of one mole each of the complexing agent and aluminum trialkyl. The combining ratios for the azides or the cyanides are somewhat different from those of the quaternary ammonium salts or the fluorides. For example, an alkali metal azide will combine with 1.8 moles of the aluminum alkyl to provide one form of complex; whereas, in the other stable form the molar ratio of aluminum alkyl to an azide is in the order of 2.1. On the other hand, the two stable forms of complexes derived from the cyanides respectively contain 1.5 and 2 moles of aluminum alkyl.

An important property of the complexes described directly hereinabove which renders them particularly useful in a variety of industrial applications resides in the fact that the higher form of the complexes, i.e., the one containing the greater combined amount of aluminum alkyl, can be pyrolyzed or thermally cleaved so as to convert this form into a mixture of free aluminum alkyls and the stable complex composition containing the lower combined amount of aluminum alkyl. Where the complexing agent is either a fluoride, cyanide, azide or quaternary ammonium compound, it is also possible to cleave the lower aluminum alkyl-containing complex thermally to obtain the complexing agent in a free state. In attempting to cleave to this extent, however, the elevated temperature conditions required inevitably result in a substantial amount of decomposition of the cleaved aluminum alkyls. Accordingly, cleaving of the lower complexes of this type is seldom, if ever, practiced. In this connection, it is mentioned that the etherates formed in employing an ether or thioether as a complexing agent can be thermally cleaved without experiencing substantial decomposition of the aluminum alkyls. The ether-type complexing agent, as well as the tertiary amines, provide only one form of a complex, specifically an equi-molar one.

On several occasions in the preceding discussion, it was indicated that the complexes herein concerned have specific use applications. One important application involving this phase of complexing chemistry will next be discussed briefly. This discussion will not only serve to point up an important utility of such complexes, but will additionally provide an insight as to the existing problems in this art which can be obviated through the implementation of my invention.

Complexes of aluminum alkyls play an important function in those methods for preparing either alcohols or alpha-olefins based upon the Ziegler process wherein ethylene is reacted with a lower trialkyl aluminum, usually aluminum triethyl. This reaction is commonly termed the "growth reaction." In accordance with this reaction, ethylene progresively adds to the ethyl radicals of the aluminum compound to yield higher molecular weight aluminum alkyls. This reaction is carried out under superatmospheric conditions and at an elevated temperature, generally in a range of about 65–150° C.

In effecting the growth reaction, the ethylene molecules do not add to the existing alkyl groups associated with aluminum in a uniform manner. As a matter of fact, there is obtained during the course of the reaction aluminum alkyl products of which the alkyl groups vary extensively in molecular weight. This variation, however, is not haphazard; rather the resultant mixture of alkyl groups corresponds to a given statistical distribution known as the Poisson relationship. This relationship can be expressed mathematically by the equation:

$$P_{(n)} = \frac{M^n e^{-n}}{n}$$

wherein $P_{(n)}$ represents the probability that a certain hydrocarbon radical will be formed by $n$ additions of ethylene to the aluminum ethyl originally present, and $m$ is the mean number of additions of ethylene per growing chain.

The growth product can be converted to provide either a mixture of primary alcohols or alpha-olefins corresponding in carbon atom lengths to that of the alkyl moiety of the aluminum alkyls constituting the growth product. For the present purpose, further discussion will be confined to the conversion of the growth product into a mixture of alpha-olefins. This is achieved by subjecting the growth product to a displacement reaction wherein the growth product is reacted with additional quantities of ethylene under such conditions whereby the ethylene displaces the higher alkyl groups of the growth product to yield the mixture of aluminum triethyl and alpha-olefins. The displacement reaction can be either thermally or catalytically induced.

Upon completion of the displacement reaction, the resultant product consists of a homogeneous mixture of aluminum triethyl and the higher alpha-olefins. This mixture must then be fractionated in order to recover the aluminum triethyl for reuse purposes. Since the boiling point of aluminum triethyl substantially corresponds to the boiling point of the dodecene present in the displacement reaction mixture, the former cannot be recovered in a satisfactorialy pure form by thermal fractionation methods. Separation of the aluminum triethyl from the displacement reaction product can, however, be readily achieved by complexing the aluminum triethyl to result in two phases consisting of the complex phase and the olefins. In accordance with this procedure, the complexing is carried out to the extent whereby the higher complex is obtained and thereupon the subsequently separated complex is cleaved to yield the lower complex and free aluminum triethyl. The latter is then recovered by distillation and recycled to the growth reactor.

By far, the bulk of the aluminum alkyls existing in the displacement reaction consists of aluminum triethyl. There are, however, also small amounts of higher undisplaced aluminum alkyls present in the displacement reaction mixture. These higher aluminum alkyls will likewise complex with the cleaved complex recycled to the displacement reactor. In a cleaving procedure designed to regenerate the full or higher complex, it is not feasible to remove the higher aluminum trialkyls, i.e., aluminum tributyl and higher, from the cleavage products because of their high boiling points. If one attempts to distill off these higher aluminum trialkyls, the temperature and/or residence conditions that must be observed in any of the conventional distillation techniques necessarily result in the pyrolysis of the lower complex with attendant substantial decomposition of the aluminum alkyls. Consequently, in following the usual cleaving conditions designed to avoid any significant decomposition of the aluminum alkyls, the higher aluminum alkyls will remain with the complex phase and continue to increase in concentration until an equilibrium relationship is attained. At this point the olefin effluent of the dsplacement reactor will contain the same amount of undisplaced heavier aluminum alkyls as was initially present in the displacement reaction product. Since it is common practice to hydrolyze the displacement reaction effluent as the final purification step in order to remove any aluminum compounds contained therein, the higher aluminum alkyls that are present will form paraffins having boiling points very close to that of the olefins; and consequently, an olefin product will result having up to several percent paraffins. The foregoing represents a significant problem in the manufacture of pure α olefins via the growth reaction. It will be appreciated by those skilled in the art how a problem such as this can be obviated through the practice of the present invention. The aforedescribed application is, however, only representative of but one of several in which the basic concept underlying the instant invention can be beneficially employed.

In accordance with the present invention a complex of the type which exists in both the lower and higher form and one containing aluminum alkyls having alkyl groups greater than ethyl can be substantially completely converted into the lower form of the complex in which the aluminum alkyl component is essentially completely that of aluminum triethyl. I have unexpectantly found that a complex containing any significant amount of aluminum alkyls of which the alkyl group has more than two carbon atoms can be reacted with aluminum triethyl in such a manner whereby the latter preferentially displaces the higher aluminum alkyl content of the complex. Further in accordance with this invention, if a sufficient amount of aluminum triethyl is reacted to convert the complex into its higher form, the resultant reaction mixture will be essentially composed of the higher form of the aluminum triethyl complex and the higher aluminum alkyls which were initially complexed with the complexing agent. Several fractionation methods can then be employed to achieve separation of such mixtures. If the freed aluminum alkyls contain alkyl groups ranging up to about 30 in carbon atom length, said mixtures can be feasibly subjected to molecular distillation. Likewise, an atomized spray of the mixture of the full complex and free aluminum alkyls can be contacted with a suitable stripping agent in order to effect nondestructive removal of the latter. The simplest and preferred fractionation method is an extractive one whereby the mixture of the complex and aluminum alkyls is extracted with a hydrocarbon, such as for example pentane, hexane, heptane, etc., which is capable of readily dissolving the aluminum alkyls but in which the complex is only slightly soluble. After the complexes containing the higher aluminum alkyls are subjected to the process of this invention, the subsequently recovered complete or higher complex can then be cleaved to provide aluminum triethyl for recycle and a regenerated lower complex for further complexing applications.

The reaction of the aluminum triethyl with the complexes containing the higher aluminum alkyls in accordance with this invention is to be carried out at a temperature between about 0° C. and 300° C. and more preferably between about 10° C. and 200° C. In a batch operation the displacement of the higher aluminum alkyl content of the complex by the aluminum triethyl will be realized upon intimately contacting these materials for a brief period of time at a temperature within the specified range. Thereafter, the phases that develop, namely the complex and the higher aluminum triethyl phase, can be separated in any of the methods generally described previously. Normally only that amount of aluminum triethyl equivalent to the amount of higher aluminum trialkyl contained by the complex need be added to effect a substantial degree of displacement of the latter. However, excesses of the aluminum triethyl can be employed, as such will accumulate in the aluminum alkyl phase which then can be recovered from this phase by a simple distillation procedure.

In order to point out to those skilled in the art how the present invention can be practiced, the following specific example is set forth. It is to be understood that this example is given primarily by way of illustration, and accordingly, any enumeration of details contaned therein should not be interpreted as a limitation upon the invention except as indicated in the appended claims.

Example

Into a suitable vessel were charged 77 parts by weight aluminum trioctyl and 52 parts by weight of a complex of aluminum triethyl and tetramethyl ammonium chloride. The complex was composed of 1.16 moles of aluminum triethyl (ATE) and 1 mole of tetramethyl ammonium chloride (TMAC). In this charge, the ratio of aluminum trioctyl to the complex was essentially an equi-molar one. The mixture was stirred at ambient room temperature, and a single-phase liquid was obtained immediately. To this homogeneous liquid were added 24 parts by weight of aluminum triethyl (ATE). The contents of the vessel were then stirred vigorously for approximately 10 minutes at 25° C. Following mixing in the indicated manner, the contents of the vessel were permitted to stand; whereupon, two phases immediately commenced to develop. Settling was carried out for a period of 24 hours at 25° C; whereupon, the two resultnat phases were separated and analyzed for weight percent aluminum and chlorine. The results of these analyses are as follows:

|  | Parts By Weight | Weight Percent Aluminum | Weight Percent Chlorine |
|---|---|---|---|
| Top Phase | 58 | 10.84 | (1) |
| Bottom Phase | 95 | 12.20 | 6.84 |

[1] Nil.

It is to be noted from the about data that, except for a trace amount, all of the original 1.16 ATE.TMAC was present in the bottom phase. This is evident from the fact that the analysis indicated a negligible amount of chlorine present in the top phase.

A material balance on the aluminum content of both the bottom and top phases was made to determine the component distribution. Since ATE contains 23.62 weight per cent aluminum and the aluminum trioctyl contains 7.35 weight percent aluminum, the following distributions were computed.

|  | Weight Percent[1] ATE | Weight Percent Aluminum Trioctyl | Weight Percent 1.16 ATE.TMAC |
|---|---|---|---|
| Bottom phase | 12 | 34 | 54 |
| Top phase | 22 | 78 |  |
| Original mixture | 16 | 50 | 34 |

[1] Exclusive of the amount of ATE originally present in the 1.16 ATE.-TMAC complex.

The data given directly hereinabove clearly show that a substantial amount of the aluminum trioctyl which had complexed with the 1.16 ATE.TMAC complex was displaced from the resultant complex by subsequent treatment with the ATE in the manner indicated. Numerically stated, the recovery of the aluminum trioctyl from the complex in the particular treatment observed amounted to about 78 weight percent.

I claim:

1. The process for recovering the alkyl groups having a carbon atom length of greater than two of the hereinafter described complexes of aluminum alkyl compounds wherein said groups are recovered in the form of trialkyl aluminum which comprises:

reacting at a temperature between about 0° C. and 300° C. aluminum triethyl with a complex of aluminum alkyls and a complexing agent capable of coordinating with two distinct molar amounts of trialkyl aluminum to form two corresponding relatively heat-stable forms thereof and wherein the alkyl radicals present in said complex have in excess of one carbon atom, including such radicals having in excess of two carbon atoms;

said reaction being carried out to the extent whereby a substantial amount of said alkyl radicals having an excess of two carbon atoms initially contained by the complex are converted to non-complexed aluminum alkyl and thereupon fractionating the reaction mixture to recover the non-complexed aluminum alkyls.

2. The process for recovering the alkyl groups having a carbon atom length of greater than two of the hereinafter-described complexes of aluminum alkyl compounds wherein said groups are recovered in the form of trialkyl aluminum which comprises:

reacting at a temperature between about 0° C. and 300° C. aluminum triethyl with a complex of the general formula $A \cdot (AlR_3)_{1-2.1}$ in which R represents an alkyl radical having in excess of one carbon atom and including an alkyl radical having in excess of two carbon atoms, and in which A represents a mole of a complexing agent selected from the group consisting of an alkali metal fluoride, an alkali metal cyanide, an alkali metal azide; a compound of the formula $(R')_n MX$ in which R' is alkyl, n is an integer of from 3–4, X is halogen and M is an element of the group consisting of nitrogen, arsenic, phosphorous, sulfur, selenium and tellurium; an ether having the formula $R^2$—O—$R^3$ wherein $R^2$ is aryl and $R^3$ is of the group consisting of aryl and alkyl; a thiolether having the formula $R^2$—S—$R^3$ wherein $R^2$ and $R^3$ have the same meaning as given above; and a tertiary amine of which one substituent is aryl and the other is one selected from the group consisting of alkyl, aryl and cycloalkyl;

said reaction being carried out to the extent whereby a substantial amount of said alkyl radicals having an excess of two carbon atoms initially contained by the complex are converted to non-complexed aluminum alkyl and thereupon fractionating the reaction mixture to recover the non-complexed aluminum alkyls.

3. A process in accordance with claim 2 wherein said complexing agent is a tetraalkyl ammonium halide.

4. A process in accordance with claim 2 wherein said complexing agent is a tetramethyl ammonium halide.

5. A process in accordance with claim 2 wherein said complexing agent is tetramethyl ammonium chloride.

6. A process in accordance with claim 2 wherein said complex is quantitatively composed of about one mole of tetramethyl ammonium chloride, one mole of triethyl aluminum and one mole of trialkyl aluminum of which the alkyl moiety has alkyl groups in excess of two carbon atoms.

7. A process in accordance with claim 2 wherein the reaction between the aluminum triethyl and said complex is effected at a temperature between about 10° C. and 200° C.

8. A process in accordance with claim 7 wherein said complexing agent is tetramethyl ammonium chloride.

References Cited

UNITED STATES PATENTS

| 3,367,989 | 2/1968 | Scoggins et al. | 260—683.15 |
| 2,844,615 | 7/1958 | Ziegler et al. | 260—448 |
| 3,119,854 | 1/1964 | Ziegler et al. | 260—448 |
| 3,153,075 | 10/1964 | Kroll | 260—448 |
| 3,249,648 | 5/1966 | Carter et al. | 260—448 |
| 3,308,143 | 3/1967 | Poe et al. | 260—448 |
| 3,317,570 | 5/1967 | Kroll et al. | 260—448 |

OTHER REFERENCES

Lehmkuhl, Angew. Chemie, vol. 3 (February 1964).

Corresponding article in German, Ziegler et al., Annalen Der Chemie, vol. 629, pp. 33, 34 and 41 to 45 (1960).

TOBIAS E. LEVOW, *Primary Examiner.*

H. M. S. SNEED, *Assistant Examiner.*